(12) United States Patent
Pentikäinen et al.

(10) Patent No.: US 6,275,943 B1
(45) Date of Patent: Aug. 14, 2001

(54) PROCEDURE FOR CARRYING OUT CHECKING FUNCTIONS RELATING TO SAFETY MANAGEMENT IN A MOBILE COMMUNICATION NETWORK AND/OR IN A WIRELESS LOCAL NETWORK

(75) Inventors: Heimo Pentikäinen; Kirsi Paananen; Kirsi-Marjut Simonen; Jyrki Suutari, all of Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/360,401

(22) Filed: Jul. 23, 1999

Related U.S. Application Data

(63) Continuation of application No. PCT/FI98/00030, filed on Jan. 15, 1998.

(30) Foreign Application Priority Data

Jan. 23, 1997 (FI) ......................................................... 970278

(51) Int. Cl.[7] ............................................................. G06F 13/00
(52) U.S. Cl. ............................................. 713/201; 455/426
(58) Field of Search ................................... 455/434, 426, 455/552, 414, 408; 713/200, 201, 202; 340/825.31, 825.34

(56) References Cited

U.S. PATENT DOCUMENTS 5,832,378 * 11/1998 Zicker et al. ......................... 455/414
5,878,344 * 3/1999 Zicker et al. ......................... 455/426
5,887,259 * 3/1999 Zicker et al. ......................... 455/434
5,953,651 * 9/1999 Lu et al. .............................. 455/408

FOREIGN PATENT DOCUMENTS 0 708 573    4/1996   (EP) .
WO 96/21327  7/1996   (WO) .

OTHER PUBLICATIONS

Arie Verschoor "Quality of Speech Services in GSM—Definition of a Universal Quality Parameter for Quality Comparison and Evaluation" *IEEE International Symposium on Personal, Indoor and Mobile Radio Communications . . .*, pp. 1348–1352, Sep. 1994.

* cited by examiner

Primary Examiner—James P. Trammell
Assistant Examiner—Pierre E. Elisca
(74) Attorney, Agent, or Firm—Altera Law Group, LLC

(57) ABSTRACT

The invention relates to a procedure for carrying out checking functions relating to safety management in a mobile communication network and/or in a wireless local network during call setup. In the procedure, information about the degree of occupancy of a data processing apparatus implementing the checking functions in a network element, such as a mobile communication switching center and/or the access node of a wireless local network, is continuously determined, the frequency of execution of the checking functions is adjusted based on the occupancy information thus determined, and checking functions are carried out on the calls according to the checking frequency defined for the respective degree of occupancy.

9 Claims, 1 Drawing Sheet

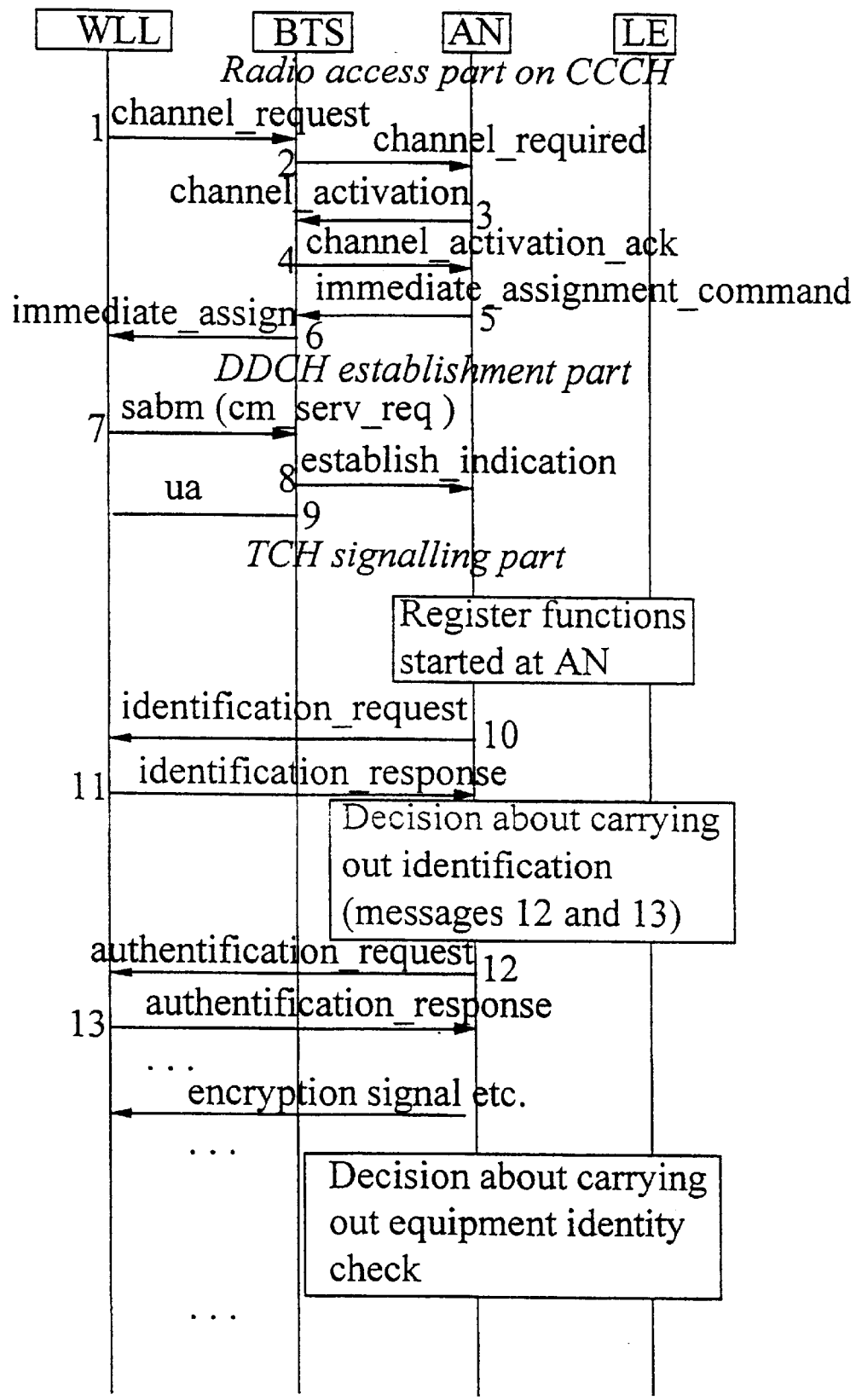

PROCEDURE FOR CARRYING OUT CHECKING FUNCTIONS RELATING TO SAFETY MANAGEMENT IN A MOBILE COMMUNICATION NETWORK AND/OR IN A WIRELESS LOCAL NETWORK

This application is a con't of PCT/FI98/00030 filed Jan. 15, 1998.

FIELD OF THE INVENTION

The present invention relates to a procedure for carrying out checking functions related to safety management during call setup in a mobile communication network or in a wireless local network.

DESCRIPTION OF RELATED ART

During call setup in a mobile communication network and/or in a wireless local network, various checking functions relating to network safety management are carried out. These checking functions are designed to prevent unauthorised network access for users not entitled to use the network, and to prevent the use of e.g. a mobile station that has been reported lost. Such checking functions are performed during call setup normally by means of a data processing apparatus used for operation control, located in a mobile communication switching centre and/or in the access node of a wireless local network. The problem is that such checking functions take up call setup time. The heavier the load on the data processing apparatus, the more the call setup is retarded. Slow call setup again is unpleasant for the user. Especially in the case of a wireless local network (WLL), fast setup of outgoing calls is important.

SUMMARY OF THE INVENTION

The object of the present invention is to eliminate the drawbacks described above.

A specific object of the invention is to present a procedure that enables the call setup speed to be kept within reasonable limits in conditions of a high level of occupancy, yet without substantially impairing network safety.

In the procedure of the invention, information about the occupancy of a data processing apparatus implementing checking functions in a network element, such as a mobile communication switching centre and/or the access node of a wireless local network, is continuously determined, the frequency of execution of the checking functions is adjusted based on the occupancy information thus determined, and checking functions are carried out on calls according to the checking frequency defined for the respective degree of occupancy.

The invention has the advantage that the procedure allows a workable and self-adjusting compromise between call setup speed and safety. In spite of a high degree of occupancy of the data processing apparatus performing checking functions, the call setup time will not substantially exceed the normal setup time because some calls are passed through without a safety check. However, safety is not substantially impaired as it is very unlikely for the next calls from the same user's mobile station to be passed through unchecked, because the degree of occupancy determining the checking frequency varies continuously.

In an embodiment of the invention, when the degree of occupancy is lower than a predetermined limit, the checking functions are carried out at a specified high checking frequency. In conditions of low occupancy, every call, or 100% of the calls, could be checked.

In an embodiment of the procedure, when the degree of occupancy is higher than a predetermined limit, the checking functions are carried out at a specified low checking frequency. In conditions of high occupancy, a definition can be made to the effect that e.g. only 5% of the calls are checked.

In an embodiment of the procedure, the limits are parameters that can be changed by the network operator.

In an embodiment of the procedure, the checking function for which the checking frequency is adjusted is authentication or the checking of the right of access, wherein the subscriber data for the mobile station are verified during call setup and possible illicit network access is denied.

In an embodiment of the procedure, the checking function for which the checking frequency is adjusted is an equipment identity check, wherein the equipment identity code sent by the mobile station is checked during call setup by comparing it with a register of equipment identity codes for mobile stations reported stolen and/or defective.

In an embodiment of the procedure, the equipment identity check is verification of the IMEI code. IMEI is an international mobile station equipment identity code, which enables the mobile station to be unambiguously identified. E.g. in the GSM system, the IMEI code is a 15-digit number and it is divided into a 6-digit type approval code (TAC), a 2-digit assembly code (FAC) identifying the assembling factory, a 6-digit serial number and a 1-digit reserve number.

In an embodiment of the procedure, the mobile communication network is a GSM/DCS mobile communication network. GSM is a European digital mobile communication system (GSM, Global System for Mobile Communications). DCS (Digital Cellular System) is a mobile communication system standardized by the ETSI and based on the GSM specification, aimed at a more effective use of microcells; e.g. DCS-1800 works in a frequency range of 1800 MHz.

In an embodiment of the procedure, the wireless local network is a so-called WLL (Wireless Local Loop) network. In a WLL network, the subscriber's station is connected via a radio link to an access node or WLL controller. The WLL system may be based e.g. on technology used in a mobile communication system, such as the GSM/DCS-1800 technology. Between the subscriber's station and the access node there is a base transceiver station, through which call signals sent by the terminal device over a radio channel are transmitted via the access node to a public telephone network and vice versa. The access node or WLL controller can be connected to the telephone exchange using e.g. the V5.1 or V5.2 protocol consistent with the ETSI standards.

In an embodiment of the procedure, identity data left unchecked because of high occupancy are stored for possible later checking.

BRIEF DESCRIPTION OF THE DRAWINGS

In the following, the invention will be described in detail by the aid of an embodiment example by referring to the attached drawing, which presents a call setup signalling diagram according to an embodiment of the procedure of the invention in a case where a subscriber's station in a wireless local network originates a call.

DETAILED DESCRIPTION OF THE INVENTION

The signalling diagram in the FIGURE represents a call originated by a subscriber's station in a wireless local network WLL, substantially corresponding to a mobile originated call MOC consistent with the GSM specifications. The system components in the diagram are a base transceiver station BTS, an access node AN and a local exchange LE.

The access node AN contains three program blocks called registers. These are an equipment register, an authentication register and, placed hierarchically above these, a main register. The equipment register contains the equipment numbers (IMEI). The equipment number may be placed on a white, grey or black list, and in an equipment identity check the equipment register returns the IMEI list colour. The authentication register produces the triplets needed for identification and contains the information required for identification. The functions of the main register include deciding about the execution of checking functions.

In the GSM/DCS world, the following register terms are used: authentication register AUC; AC (authentication centre), equipment register EIR (equipment identity register) and main register VLR (visitor location register). In wireless local loop environment, the main register block is termed WFR (wireless fixed register).

The call setup procedure in a wireless local network in a so-called non-transparent mode as presented in the figure is substantially similar to call setup in a normal GSM system. In a wireless local network system, the access node AN also comprises functions that are included in the mobile services switching centre/visitor location register MSC/VLR and home location register/authentication centre/equipment identity register of a normal GSM system. The subscriber's stations in a wireless local loop WLL communicate with the access node AN over a radio link. The signalling between the subscriber's station WLL and the access node AN consists of message-based signalling consistent with the GSM specifications (GSM/DCS). The access node AN again is connected to a wired network local exchange LE via an V5.2 interface consistent with the ETS 300 347-1 standard.

When a subscriber lifts the receiver, the subscriber's station generates a local dialling tone. The subscriber has a predetermined length of time to dial the first digit. The dialling tone goes off as soon as the first digit has been dialled. Call setup is started upon the lapse of a predetermined period of time after the last digit has been dialled. The subscriber's station WLL requests a call by sending a CHANNEL REQUEST message to the base transceiver station BTS. The base transceiver station BTS transmits the channel request to the access node AN, which starts searching for a communication channel. After a communication channel has been successfully reserved, the access node activates the channel by sending a CHANNEL ACTIVATION message to the base transceiver station BTS. The base transceiver station BTS acknowledges successful activation by returning a CHANNEL ACTIVATION ACK message. The base transceiver station BTS starts transmission and reception over this channel using the capacity and timing data received in the CHANNEL ACTIVATION message. After successful activation of the communication channel, the access node AN transmits an IMMEDIATE ASSIGNMENT COMMAND message to the base transceiver station BTS. This message contains an IMMEDIATE ASSIGNMENT message, which is sent by the base transceiver station BTS to the subscriber's station WLL. Upon receiving the IMMEDIATE ASSIGNMENT message, the subscriber's station WLL is tuned to the communication channel assigned and starts setting up a signalling link over the network. The subscriber's station WLL transmits a layer-2 SABM message to the base transceiver station BTS via the communication channel. SABM contains a layer-3 service request message. The base transceiver station transmits the service request of the subscriber's station further to the access node AN in an ESTABLISH INDICATION message, which includes a temporary mobile subscriber identity code TMSI. The base transceiver station BTS acknowledges the SABM message by sending a UA frame to the subscriber's station WLL. At this stage, the wireless fixed register program block WFR issues to the control program an inquiry about the occupancy of the computer unit and, based on this, decides whether authentication is to be carried out and somewhat later, after possible authentication, encrypting message etc., the wireless fixed register likewise decides whether an equipment identity check (IMEI check) is to be carried out or not. The rest of the message exchange in the call setup procedure is done in accordance with the conventional scheme, which will not be described here in detail.

The checking functions can be implemented for example in such a way that if the degree of occupancy of the computer unit performing the checking functions is 30% or below, then the authentication and equipment identity checks are carried out for every call. If the computer unit's occupancy is 70% or above, no checking functions are performed at all. When the occupancy is between 30–70%, the checking frequency could grow e.g. linearly from a frequency covering all calls to a frequency covering every twentieth call. The limits are preferably parameters subject to change by the operator. In addition, it is possible to use an arrangement in which the checking frequency and the equipment authentication frequency are somewhat different from each other so that these functions will not have to be performed on the same call when not all calls are checked.

The invention is not limited to the embodiment example presented above, but many variations are possible within the framework of the inventive idea defined by the claims.

What is claimed is:

1. A method for carrying out checking functions relating to safety management in a mobile communication network and in a wireless local network during call setup, the method comprising:

continuously determining information about the degree of occupancy of a data processing apparatus implementing checking functions in a network element, including a mobile communication switching centre or an access node of a wireless local network, adjusting a frequency of execution of the checking functions based on the occupancy information previously determined, and executing the checking functions on calls according to the checking frequency defined for the respective degree of occupancy.

2. The method as defined in claim 1, wherein, when the occupancy is below a predetermined limit, the checking functions are carried out at a predetermined high checking frequency.

3. The method as defined in claim 1, wherein, when the occupancy is above a predetermined limit, the checking functions are carried out at a predetermined low checking frequency.

4. The method as defined in claim 2, wherein the limits are parameters that can be changed by a network operator.

5. The method as defined in claim 1, wherein the checking function for which the checking frequency is adjusted is authentication, or the checking of the right of access, wherein subscriber data for the mobile station are verified during call setup and illicit network access is denied.

6. The method as defined in claim 1, wherein the checking function for which the checking frequency is adjusted is an equipment identity check, wherein an equipment identity code sent by a mobile station is checked during call setup by comparing it with a register of equipment identity codes for mobile stations reported stolen and defective.

7. The method as defined in claim 6, wherein the equipment identity check is a verification of an IMEI code.

8. The method as defined in claim 1, wherein the wireless local network is a WLL network (Wireless Local Loop).

9. The method as defined in claim 1, wherein identity data left unchecked because of a high degree of occupancy is stored for later checking.

* * * * *